United States Patent
Degiacomi et al.

(10) Patent No.: US 12,435,805 B2
(45) Date of Patent: Oct. 7, 2025

(54) MULTIFUNCTION VALVE WITH A THERMAL SAFETY DEVICE

(71) Applicant: OMB SALERI S.P.A.—SOCIETA' BENEFIT, Brescia (IT)

(72) Inventors: Nicola Degiacomi, Brescia (IT); Renato Santulli, Brescia (IT); Giacomo Morelli, Brescia (IT); Francesco Mondinelli, Brescia (IT)

(73) Assignee: OMB SALERI S.P.A.—SOCIETA' BENEFIT, Brescia (IT)

( * ) Notice: Subject to any disclaimer, the term of this patent is extended or adjusted under 35 U.S.C. 154(b) by 0 days.

(21) Appl. No.: 18/712,597

(22) PCT Filed: Nov. 3, 2022

(86) PCT No.: PCT/IB2022/060597
§ 371 (c)(1),
(2) Date: May 22, 2024

(87) PCT Pub. No.: WO2023/118992
PCT Pub. Date: Jun. 29, 2023

(65) Prior Publication Data
US 2025/0012370 A1    Jan. 9, 2025

(30) Foreign Application Priority Data
Dec. 23, 2021  (IT) .......................... 102021000032540

(51) Int. Cl.
*F16K 17/40*   (2006.01)
*F16K 17/38*   (2006.01)
(Continued)

(52) U.S. Cl.
CPC .......... *F16K 17/403* (2013.01); *F16K 17/383* (2013.01); *F17C 13/04* (2013.01);
(Continued)

(58) Field of Classification Search
CPC ...... F16K 17/403; F16K 17/383; F17C 13/04; F17C 13/06; F17C 13/123; F17C 13/12;
(Continued)

(56) References Cited

U.S. PATENT DOCUMENTS 4,281,718 A  *  8/1981  Claussen ................ A62C 37/40
                                                        169/41
5,511,576 A  *  4/1996  Borland ................ F16K 17/383
                                                        137/72

(Continued)

FOREIGN PATENT DOCUMENTS

DE    102018211964 A1    1/2020
EP        3714202 B1     5/2021
(Continued)

OTHER PUBLICATIONS

International Search Report for International Patent Application No. PCT/IB2022/060597, mailed Feb. 2, 2023.

*Primary Examiner* — Minh Q Le
(74) *Attorney, Agent, or Firm* — Armstrong Teasdale LLP

(57) ABSTRACT

A multifunction valve for a tank containing high-pressure hydrogen of an automotive fuel cell system is provided. The multifunction valve has a thermal safety device, an auxiliary device adapted to act mechanically on a bulb of the thermal safety device to break the bulb, and a trigger group provided with a heat sensitive element consisting at least in part of a wire made of a shape-memory material.

15 Claims, 4 Drawing Sheets

(51) Int. Cl.
*F17C 13/04* (2006.01)
*F17C 13/06* (2006.01)
*F17C 13/12* (2006.01)

(52) U.S. Cl.
CPC .............. *F17C 13/06* (2013.01); *F17C 13/12* (2013.01); *F17C 13/123* (2013.01); *F17C 2201/056* (2013.01); *F17C 2205/0314* (2013.01); *F17C 2205/032* (2013.01); *F17C 2205/0323* (2013.01); *F17C 2205/0326* (2013.01); *F17C 2205/0329* (2013.01); *F17C 2205/0332* (2013.01); *F17C 2205/0335* (2013.01); *F17C 2205/0385* (2013.01); *F17C 2221/012* (2013.01); *F17C 2270/0168* (2013.01); *F17C 2270/0184* (2013.01)

(58) Field of Classification Search
CPC ........ F17C 2201/056; F17C 2205/0323; F17C 2205/0385; F17C 2205/0314; F17C 2205/032; F17C 2205/0326; F17C 2205/0329; F17C 2205/0332; F17C 2205/0335; F17C 2221/012; F17C 2270/0168; F17C 2270/0184
USPC .......................................................... 137/72

See application file for complete search history.

(56) References Cited

U.S. PATENT DOCUMENTS

| | | | | |
|---|---|---|---|---|
| 5,788,212 | A * | 8/1998 | Hackman | F16K 17/38 251/66 |
| 6,269,830 | B1 * | 8/2001 | Ingle | G05D 23/026 137/79 |
| 6,286,536 | B1 * | 9/2001 | Kamp | F16K 17/38 137/68.13 |
| 6,382,232 | B1 | 5/2002 | Portmann | |
| 9,097,358 | B2 * | 8/2015 | Girouard | F16K 31/002 |
| 2005/0150548 | A1 * | 7/2005 | Kita | F16K 17/383 137/72 |
| 2014/0261742 | A1 * | 9/2014 | Heise | H01M 8/04776 137/72 |
| 2014/0261748 | A1 * | 9/2014 | Smith | F16K 17/403 137/68.11 |
| 2015/0159764 | A1 * | 6/2015 | Peli | F16K 17/383 137/72 |
| 2016/0281859 | A1 * | 9/2016 | Saleri | F17C 13/04 |
| 2017/0335983 | A1 | 11/2017 | Barnes et al. | |
| 2017/0335984 | A1 * | 11/2017 | Carter | F16K 17/406 |
| 2020/0018411 | A1 * | 1/2020 | Kato | F16K 17/383 |
| 2021/0172540 | A1 * | 6/2021 | Morgan | F16K 31/002 |
| 2024/0003499 | A1 * | 1/2024 | Muehleder | F17C 13/04 |
| 2024/0030548 | A1 * | 1/2024 | Mondinelli | F16K 17/406 |

FOREIGN PATENT DOCUMENTS

| | | |
|---|---|---|
| WO | 2021214701 A1 | 10/2021 |
| WO | 2021240456 A1 | 12/2021 |

* cited by examiner

MULTIFUNCTION VALVE WITH A THERMAL SAFETY DEVICE

CROSS-REFERENCE TO RELATED APPLICATIONS

This application is a National Phase Application of PCT International Application No. PCT/IB2022/060597, having an International Filing Date of Nov. 3, 2022, which claims priority to Italian Application No. 102021000032540, filed Dec. 23, 2021, each of which is hereby incorporated by reference in its entirety.

TECHNICAL FIELD

The object of the present invention is a multifunction valve for a high-pressure hydrogen tank of an automotive fuel cell system. In particular, the object of the present invention is a multifunction valve provided with a thermal safety device.

PRIOR ART

In high-pressure hydrogen fuel cell plants, the gas is loaded into a tank at a very high pressure, for example 350 or 700 or sometimes 1000 bar. A multifunction valve (OTV valve) is applied to the tank, which multifunction valve, in addition to managing the flow of gas from a supply port to the tank and from the tank to downstream devices, is usually capable of fulfilling other functions, for example functions for detecting operating parameters, such as the temperature and pressure of the gas, and safety functions. For this purpose, an OTV valve usually comprises a thermal safety device that allows for the sudden discharge of the hydrogen loaded into the tank in the event that the valve reaches a temperature higher than a threshold safety temperature.

The Applicant, for years now, has been producing and marketing an OTV valve that is highly appreciated by the market, and is also the holder of numerous international applications relating to such valves.

However, in order to ensure an ever-increasing level of safety, the efforts of companies in the sector are constantly oriented towards seeking innovative solutions. In particular, in the case of thermal safety devices, efforts are aimed at devising devices that commence with the evacuation of gas under pressure as soon as the system is in a hazardous situation.

Object of the Invention

The object of the present invention is to provide a multifunction valve of the aforementioned type that is equipped with a thermal safety device capable of immediately detecting a dangerous condition and immediately commencing with the evacuation of the gas under pressure.

Such an object is achieved by a multifunction valve as described and claimed herein. Advantageous embodiments of the multifunction valve are also described.

In particular, this object is achieved by a multifunction valve comprising:
- a valve body applicable to the tank, internally having a by-pass duct in communication upstream with the tank and an evacuation duct in communication downstream with the external environment and upstream with the by-pass duct;
- a thermal safety device operative between the by-pass duct and the evacuation duct, provided with a bulb which is breakable when exposed to a temperature higher than a threshold safety temperature;
- an auxiliary device adapted to act mechanically on the bulb to break it, comprising a hammer which is movable between an advanced position, in which it impacts against the bulb, and a backward position, in which it does not influence the bulb;
- a trigger group which, in a configuration of normal operation of the multifunction valve, retains the hammer in the backward position and, in a configuration of remote emergency, is disengaged from the hammer so that said hammer is brought into the advanced position in which it breaks the bulb;
- wherein the trigger group comprises a stop which is movable between an advanced position, in which it mechanically engages the hammer holding it in the backward position, and a backward position, in which it is disengaged from the hammer; and
- wherein said trigger group comprises a heat sensitive element which extends along a rectilinear trigger axis beyond the multifunction valve, which is operatively connected to the stop, and which comprises at least one heat sensitive section consisting of a wire made of a shape-memory material, which tends to shorten above a critical temperature, thus moving the stop into the backward position.

BRIEF DESCRIPTION OF THE DRAWINGS

The features and the advantages of the multifunction valve according to the present invention appear more clearly from the following description, made by way of an indicative and non-limiting example with reference to the drawings of the accompanying figures, wherein.

DETAILED DESCRIPTION

Figure 1:
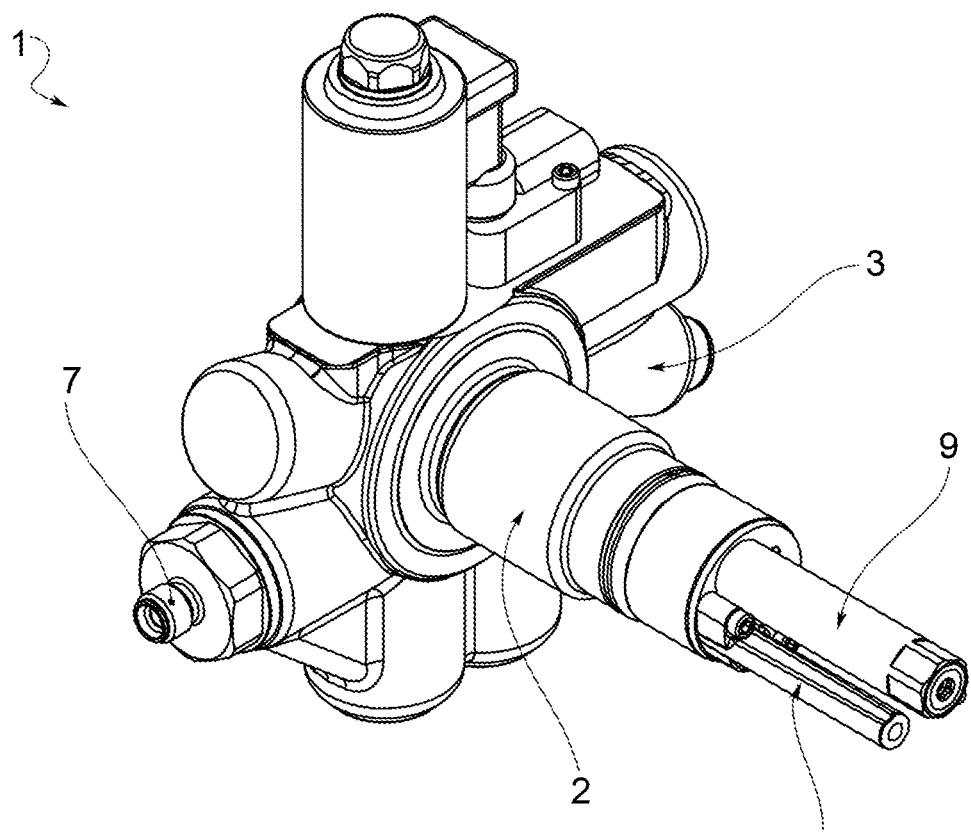
FIG. 1 shows a multifunctional valve with a thermal safety device according to one embodiment of the present invention.
Figure 2:
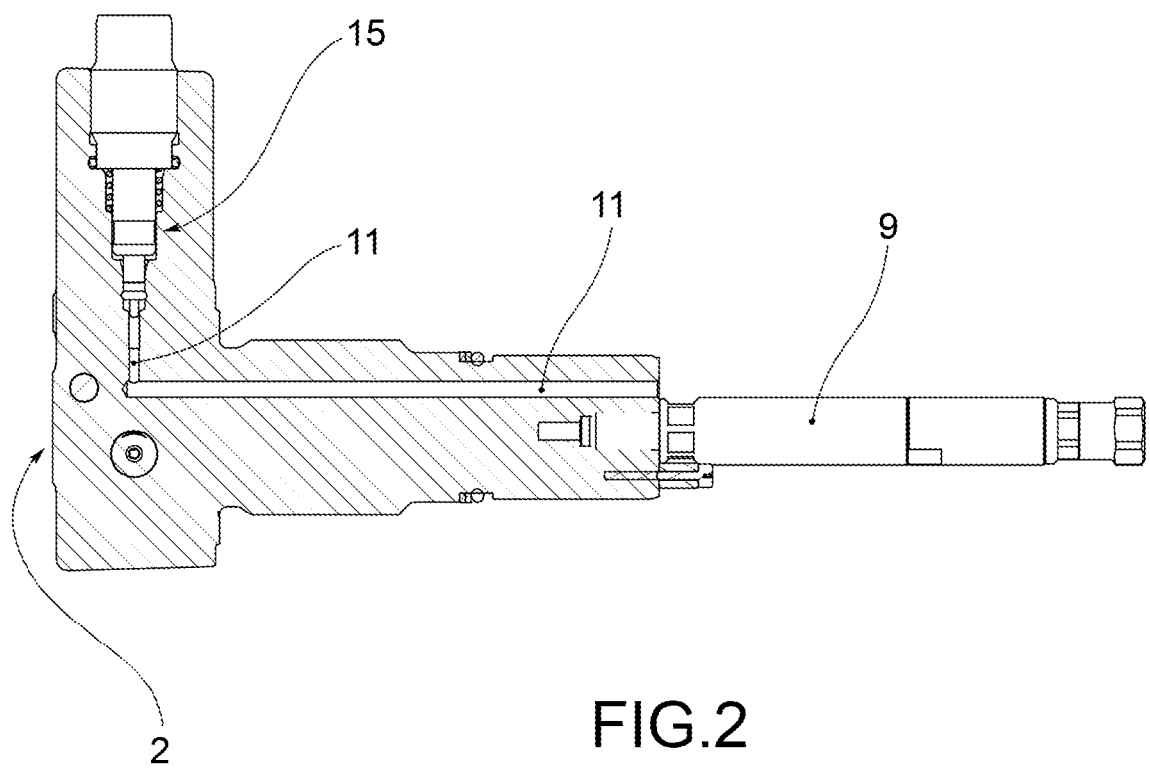
FIG. 2 is a longitudinal cross section of the multifunctional valve in FIG. 1.

With reference to the figures in the attached tables, a multifunction valve (OTV valve) for a tank 101 containing high-pressure hydrogen is indicated as a whole with 1. Typically, in the case of application to automotive systems, hydrogen is loaded into the tank at a pressure of 350, 700 or even 1000 bar.

The OTV valve 1 comprises a valve body 2 applicable to the tank 101, for example by means of a threaded neck; preferably, the valve body is manufactured as a single part made of a metal material, for example aluminum, by means of machining from a semi-finished product obtained by hot pressing.

The OTV valve comprises a supply inlet duct 3, implemented in part within the valve body 2, intended to be connected to a gas supply system, and a supply outlet duct 5, implemented in part within the valve body 2, which, downstream (taking into account the direction of the gas during the supply phase), flows into the tank and, upstream, is in communication with the supply inlet duct 3. The OTV valve also comprises an outlet duct 7, implemented in part within the valve body 2, for supplying gas to components downstream of the OTV valve, and an inlet duct 9, implemented in part within the valve body 2, which, upstream (taking into account the direction of the gas during the gas use phase), is in communication with the tank and, downstream, is in communication with the outlet duct 7. Preferably, the supply inlet duct 3 and the outlet duct 7 are partly overlapped.

Within the valve body 2, the OTV valve 1 further comprises a by-pass duct 11 which, upstream (taking into account the direction of the gas during an emergency evacuation phase), flows into the tank and an evacuation duct 13 in communication downstream with the external environment and upstream with the by-pass duct 11.

A thermal safety device 15 (TPRD device) is operative between the by-pass duct 11 and the evacuation duct 13.

The TPRD device 15 comprises a shutter 17 extending along a shutter axis X and is translatable along said shutter axis X between a closing position, in which it prevents the fluid connection between the by-pass duct 11 and the evacuation duct 13, and an opening position, in which it allows the fluid connection between the by-pass duct 11 and the evacuation duct 13.

The TPRD device 15 further comprises an elastic element 19 in compression, which permanently operates on the shutter 17, influencing it from the closing position towards the opening position.

Furthermore, the TPRD device comprises a breakable, temperature-sensitive bulb 21; the bulb 21, when intact, is configured and arranged in such a way to prevent the translation of the shutter 17 from the closing position to the opening position; in other words, when intact, the bulb 21 opposes the action of the elastic element 19. For example, the bulb 21 extends in the direction of the shutter axis X, for example coaxially to said shutter 17.

To this end, preferably, the TPRD device 15 comprises a seat 23 and a threaded cap 25; the bulb 21 is abutting, on the one hand, against the shutter 17 and, on the other hand, against the seat 23, fixedly held in position by the cap 25.

Figure 3:
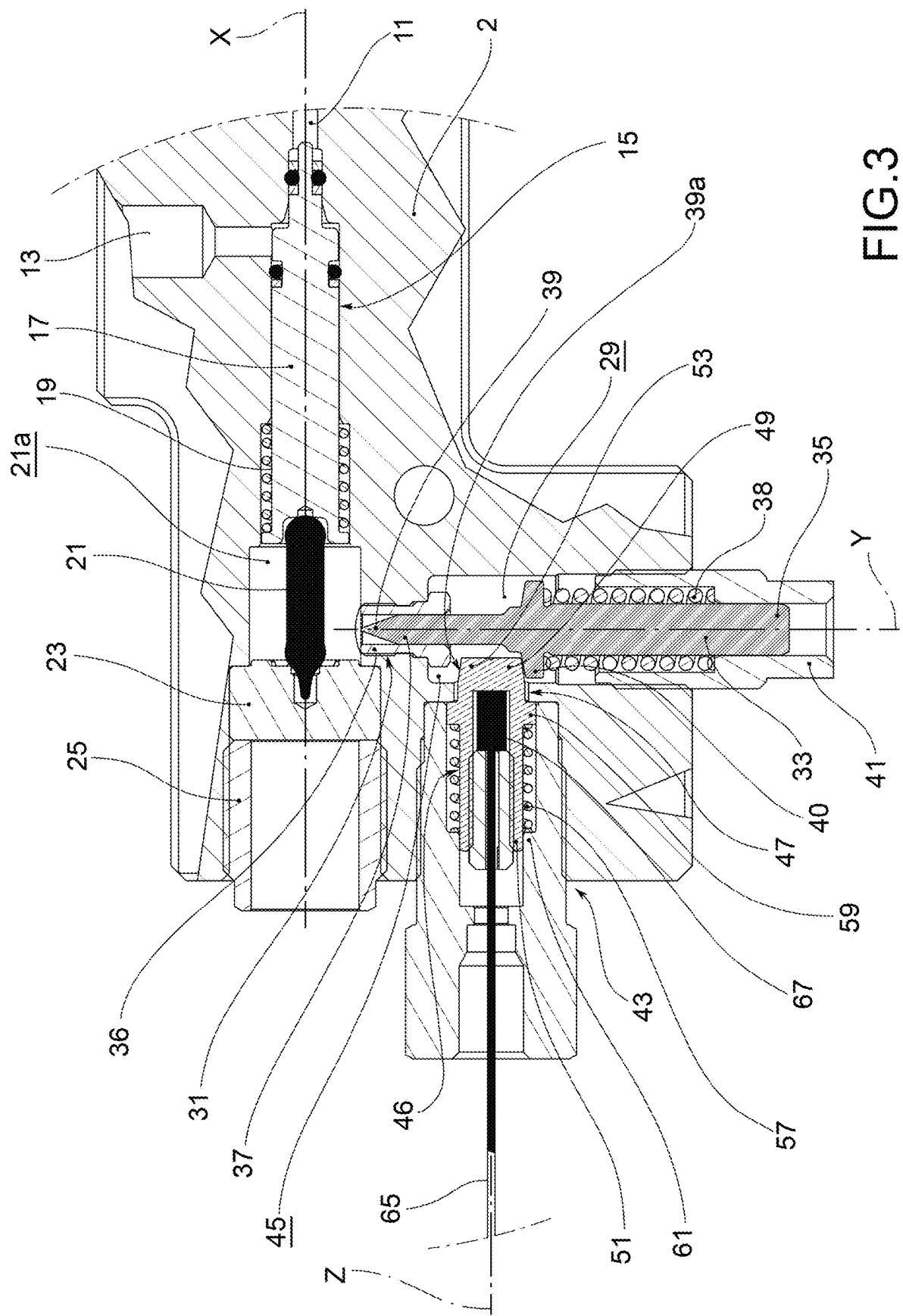
FIG. 3 shows the thermal safety device, an auxiliary safety device and a trigger group in a configuration of normal operation of the multifunction valve.

In a configuration of normal use (FIG. 3), the shutter 17 is in the closing position in which it prevents communication between the by-pass duct 11 and the evacuation duct 13; the gas under pressure present within the by-pass duct 11 may therefore not flow towards the evacuation duct 13. In such a configuration, the elastic element 19 pushes the shutter 17 towards the opening position, but the bulb 21, accommodated within a bulb compartment 21*a* of the valve body 2, locked between the shutter 17 and the seat 23, opposes the action of the elastic element 19, so that the shutter remains in the closing position.

Figure 4:
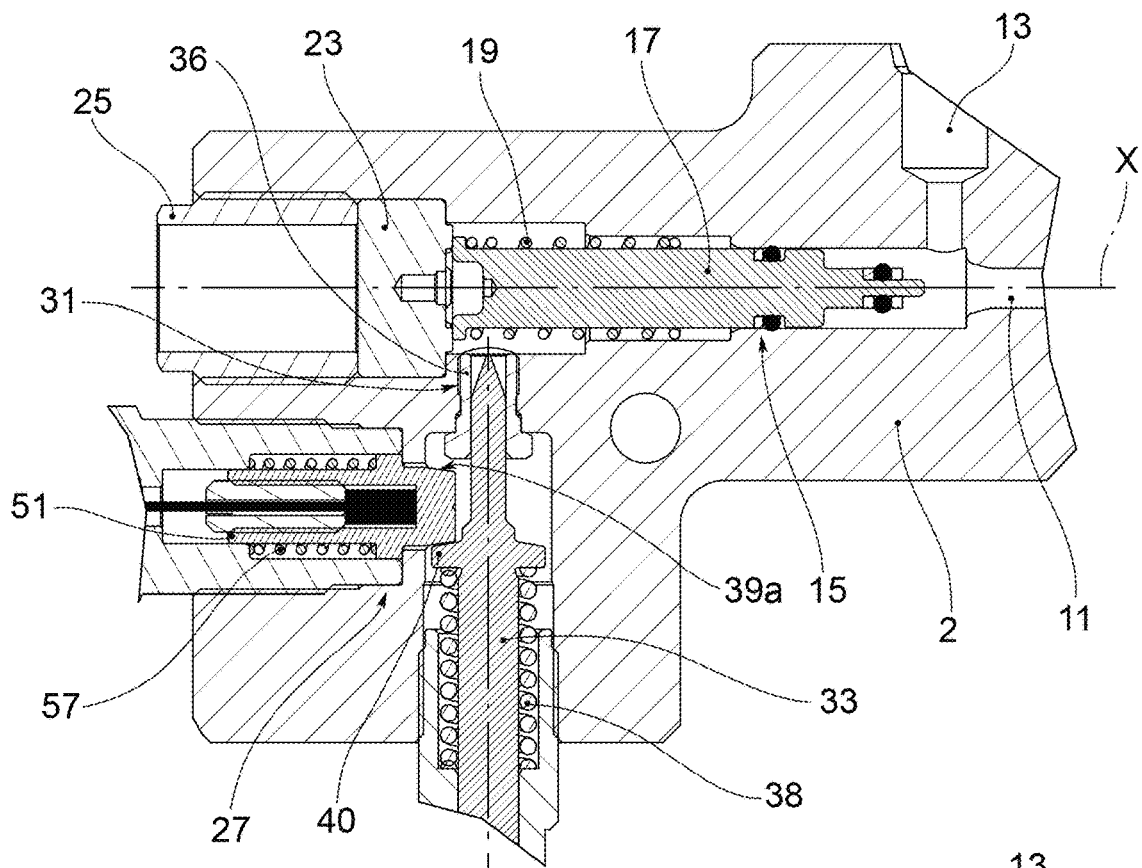
FIG. 4 shows the thermal safety device in a local emergency configuration.

When the temperature in an area near the bulb 21 exceeds a predefined threshold value (safety threshold temperature), for example due to a fire, the bulb 21 explodes and shatters, so that the elastic element 19 pushes the shutter into the opening position, without impediment. The fluid connection between the by-pass duct 11 and the evacuation duct 13 is thus restored and the gas under pressure may suddenly flow from the tank to the external environment, through the outlet duct 5, the by-pass duct 11 and the evacuation duct 13 (local emergency configuration, FIG. 4).

The OTV valve further comprises an auxiliary device 27 adapted to act mechanically on the bulb 21 to break it.

For example, the valve body 2 comprises an auxiliary compartment 29 in communication with the bulb compartment 21*a*, preferably via an auxiliary passage 31 of reduced diameter compared to that of the auxiliary compartment 29.

The auxiliary device 27 comprises a hammer 33 at least partially received in said auxiliary passage 31 of the valve body, in a sliding manner; the hammer 33 extends mainly along an impact axis Y between a distal end 35 and a proximal end 37, close to the bulb compartment 21*a*.

The hammer 33 is movable, and in particular translatable, between an advanced position, in which it impacts against the bulb 21, and a backward position, in which it does not influence the bulb 21.

Preferably, the hammer 33, at the proximal end 37, comprises a pointed head 39, for example coaxial to the impact axis Y, placed in front of the bulb 21 when intact. In the advanced position, the head 39 impacts the bulb 21, breaking it.

Preferably, moreover, the auxiliary device 27 comprises a guide bush 36, placed in the auxiliary passage 31, inside which the hammer 33 is guided in a sliding manner.

In addition, the auxiliary device 27 comprises an elastic element 38 configured to permanently influence the hammer towards the advanced position. For example, the elastic element 38 is a spring, placed under compression between a shoulder 40 of the hammer 33, and an auxiliary cap 41 fixed to the valve body 2 closing the auxiliary compartment 29, preferably screwed thereto.

Figure 5:
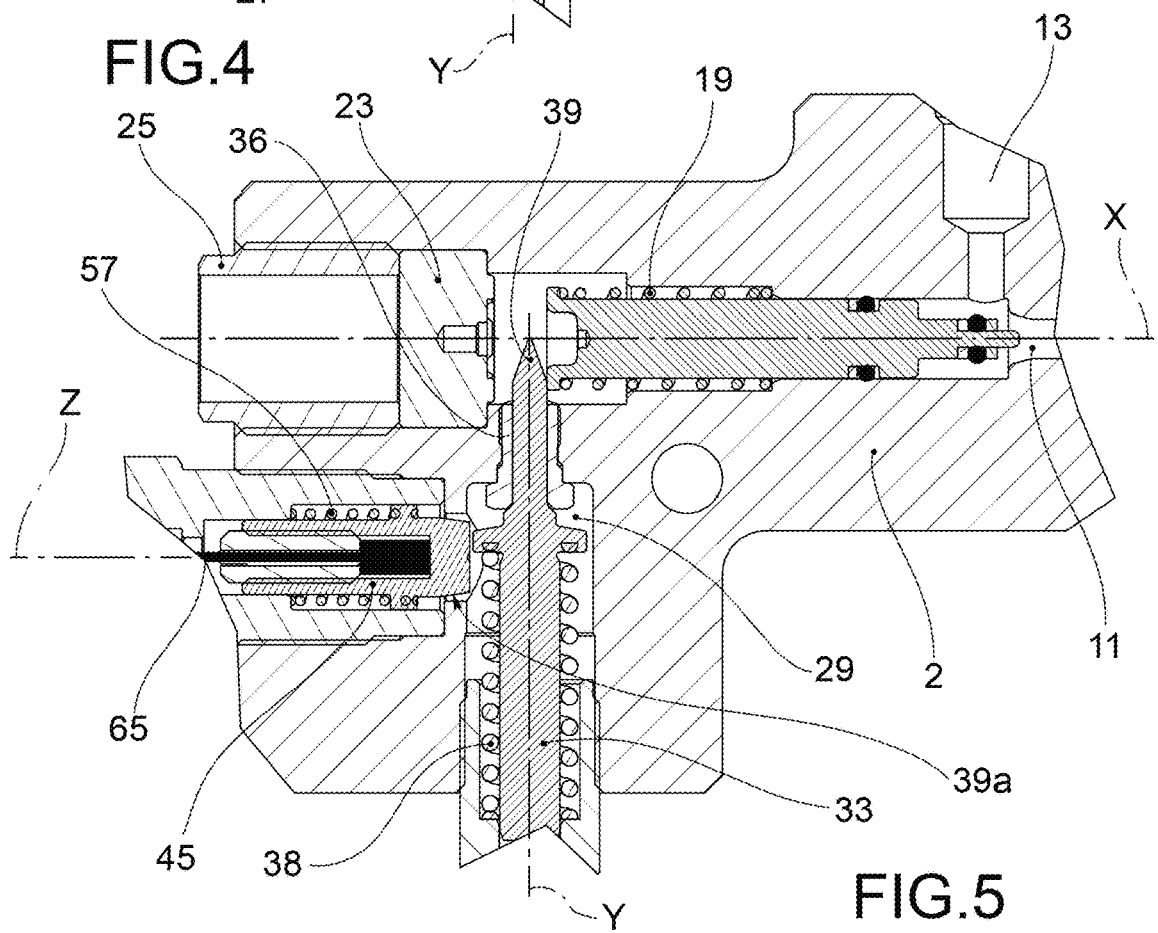
FIG. 5 shows the thermal safety device in a configuration of remote emergency.

The auxiliary device 27 further comprises a trigger group 43 which, in the normal operating configuration (FIG. 3), retains the hammer 33 in the backward position and, in a configuration of remote emergency (FIG. 5), is disengaged from the hammer 33 so that it may be brought, under the action of the elastic element 38, into the advanced position in which it breaks the bulb 21.

For example, the valve body 2 comprises a trigger compartment 45 in communication with the auxiliary compartment 29, preferably via a trigger passage 47 of reduced diameter in relation to the diameter of the trigger compartment 45.

The trigger group 43 comprises a stop 46 at least partially accommodated within the trigger compartment 45, sliding between an advanced position in which it mechanically engages the hammer 33, holding it in the backward position, and a backward position, in which it is disengaged from the hammer 33. The stop 46 is translatable from the advanced position to the backward position along a trigger axis Z.

Preferably, the stop 46 extends predominantly along said trigger axis Z between a proximal end 49 close to the hammer 33 and an opposite distal end 51. At the proximal end 49, preferably, the stop 46 comprises an engagement head 53 which, in the advanced position of the stop, engages the hammer 33. In particular, the head 53 is in contact with the shoulder 40 of the hammer 33; preferably, the head 53 of the stop 46 has a truncated cone shape, is coaxial to the trigger axis Z and influences a truncated cone surface 39*a* of the shoulder 40, coaxial to the impact axis Y.

The trigger group 43 further comprises an elastic element 57 configured to permanently influence the stop 46 towards the advanced position. For example, the elastic element 57 is in compression between a radial projection 59 of the stop 46 and a fixed abutment 61, for example formed by a trigger plug 63 fixed to the valve body 2 closing the trigger compartment 45, for example screwed to it.

The trigger group 43 further comprises a heat sensitive element 65 comprising at least one heat sensitive section consisting of a wire made of a shape-memory material (SMA wire), which tends to shorten above a critical temperature. Preferably, the entire heat sensitive element 65 consists of an SMA wire.

The heat sensitive element 65 has a prevalent extension along the direction of the trigger axis Z, preferably coaxial therewith, and is fixed at a first end 67 to the stop 46 and at the other end to a fixed abutment, for example in a zone of the tank. The heat sensitive portion of the heat sensitive element 65 may then be in a remote zone of the multifunction valve. Or else, the entire heat sensitive element consists of an SMA wire, whereby the entire area of the tank, from the multifunction valve to the fixed stop, is monitored.

In the normal operating configuration (FIG. 3), the stop 46 is in the advanced position and holds the hammer 33 in the backward position.

In the configuration of remote emergency (FIG. 5), in which the heat sensitive section of the heat sensitive element 65 senses a temperature higher than the critical temperature, the heat sensitive element 65 influences the stop 46 due to the shortening thereof, pulling it towards the backward position, overcoming the resistive action of the elastic element 57.

Consequently, the stop 46 disengages the hammer 33 which, under the action of the elastic element 38, moves to the advanced position in which it breaks the bulb 21. Consequently, the shutter 17, under the action of the elastic element 19, is moved to the open position, allowing the gas to suddenly escape from the evacuation duct 13.

The multifunction valve 1 is typically applied to a neck 99 of the tank 101; the neck is cylindrical and has a tank axis K.

Figure 6:
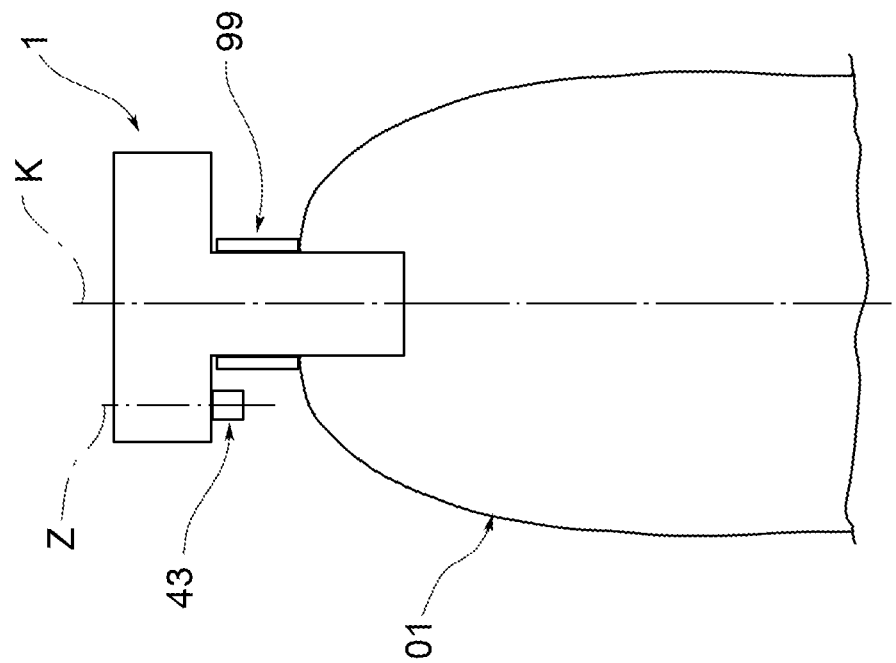
FIGS. 6 and 7 are schematic representations of the multifunction valve applied to a tank.

According to one embodiment of the invention, the multifunction valve 1 and/or the trigger group 43 are configured in such a way that the trigger axis Z is orthogonal to the tank axis K (FIG. 6).

Figure 7:
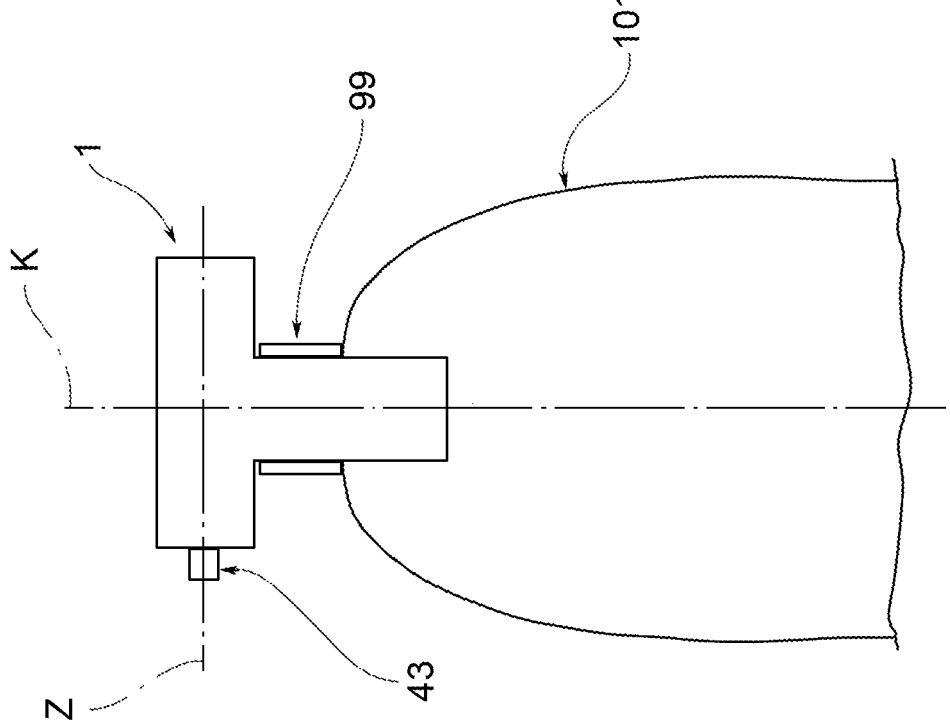

According to a further embodiment of the invention, the multifunction valve 1 and/or the trigger group 43 are configured in such a way that the trigger axis Z is parallel to the tank axis K (FIG. 7).

Preferably, moreover, the heat sensitive element 65 is fixed, in a remote zone of the multifunction valve 1, to the tank 101, for example at an area axially opposite to that of the neck 99 whereto the multifunction valve is applied or to an area of the side mantle of the tank. Advantageously, this makes it possible to monitor the temperature for the entire tank.

Innovatively, the multifunction valve according to the present invention satisfies the needs of the sector, insofar as it increases the level of safety, since the thermal safety device comes into operation both in the case of a local temperature increase, by virtue of the breaking of the bulb, and in the case of a temperature increase in a remote zone of the valve, by virtue of the heat sensitive element of the trigger group.

It is clear that a person skilled in the art may make changes to the multifunction valve described above in order to meet incidental needs, which changes all fall within the scope of protection defined in the following claims.

What is claimed is:

1. A multifunction valve for a tank containing high-pressure hydrogen of an automotive fuel cell system, comprising:
   a valve body applicable to the tank, internally having a by-pass duct in communication upstream with the tank and an evacuation duct in communication downstream with an external environment and upstream with the by-pass duct;
   a thermal safety device operative between the by-pass duct and the evacuation duct, provided with a bulb, which is breakable when exposed to a temperature higher than a threshold safety temperature;
   an auxiliary device adapted to act mechanically on the bulb to break the bulb, the auxiliary device comprising a hammer that is movable between an advanced position, in which the hammer impacts against the bulb, and a backward position, in which the hammer does not influence the bulb;
   a trigger group, which, in a configuration of normal operation of the multifunction valve, retains the hammer in the backward position and, in a configuration of remote emergency, is disengaged from the hammer, so that the hammer is brought into the advanced position, in which the hammer breaks the bulb;
   wherein the trigger group comprises a stop movable between an advanced position, in which the stop mechanically engages the hammer holding the hammer in the backward position and a backward position, in which the stop is disengaged from the hammer; and
   wherein the trigger group further comprises a heat sensitive element, extending along a rectilinear trigger axis beyond the multifunction valve, the heat sensitive element being operatively connected to the stop, and comprising at least one heat sensitive section consisting of a wire made of a shape-memory material, which tends to shorten above a critical temperature, moving the stop into the backward position.

2. The multifunction valve of claim 1, wherein the entire heat sensitive element consists of a shape-memory wire.

3. The multifunction valve of claim 1, wherein the thermal safety device comprises a shutter extending along a shutter axis, the shutter being translatable along said shutter axis between a closing position, in which the shutter prevents a fluidic connection between the by-pass duct and the evacuation duct, and an opening position, in which the shutter allows the fluidic connection between the by-pass duct and the evacuation duct.

4. The multifunction valve of claim 3, wherein the thermal safety device further comprises an elastic element in compression, which permanently operates on the shutter influencing the shutter from the closing position towards the opening position.

5. The multifunction valve of claim 3, wherein, when the bulb is integral, the bulb prevents the shutter from translating from the closing position to the opening position.

6. The multifunction valve of claim 1, wherein the hammer is translatable along an impact axis.

7. The multifunction valve of claim 6, wherein the hammer, at a proximal end, comprises a pointed head.

8. The multifunction valve of claim 5, wherein the auxiliary device comprises an elastic element configured to permanently influence the hammer towards the advanced position.

9. The multifunction valve of claim 1, wherein the stop is translatable from the advanced position to the backward position along said rectilinear trigger axis.

10. The multifunction valve of claim 9, wherein the stop, at a proximal end, comprises an engagement head, which, in the advanced position of the stop, engages the hammer, and wherein said engagement head has a truncated cone shape, is coaxial to the rectilinear trigger axis and influences a truncated cone surface of a shoulder of the hammer, coaxial to an impact axis.

11. The multifunction valve of claim 9, wherein the heat sensitive element has a prevalent extension along a direction of the rectilinear trigger axis.

12. An assembly comprising:
- a multifunction valve for a tank containing high-pressure hydrogen of an automotive fuel cell system, comprising:
  - a valve body applicable to the tank, internally having a by-pass duct in communication upstream with the tank and an evacuation duct in communication downstream with an external environment and upstream with the by-pass duct;
  - a thermal safety device operative between the by-pass duct and the evacuation duct, provided with a bulb, which is breakable when exposed to a temperature higher than a threshold safety temperature;
  - an auxiliary device adapted to act mechanically on the bulb to break the bulb, the auxiliary device comprising a hammer that is movable between an advanced position, in which the hammer impacts against the bulb, and a backward position, in which the hammer does not influence the bulb;
  - a trigger group, which, in a configuration of normal operation of the multifunction valve, retains the hammer in the backward position and, in a configuration of remote emergency, is disengaged from the hammer, so that the hammer is brought into the advanced position, in which the hammer breaks the bulb;
  - wherein the trigger group comprises a stop movable between an advanced position, in which the stop mechanically engages the hammer holding the hammer in the backward position and a backward position, in which the stop is disengaged from the hammer; and
  - wherein the trigger group further comprises a heat sensitive element extending along a rectilinear trigger axis beyond the multifunction valve, the heat sensitive element being operatively connected to the stop and comprising at least one heat sensitive section consisting of a wire made of a shape-memory material, which tends to shorten above a critical temperature, moving the stop into the backward position; and
- a tank having a cylindrical neck with a tank axis;
- wherein the multifunction valve is applied to the neck of the tank.

13. The assembly of claim 12, wherein the multifunction valve and/or the trigger group are configured so that the rectilinear trigger axis is orthogonal to the tank axis.

14. The assembly of claim 12, wherein the multifunction valve and/or the trigger group are configured so that the rectilinear trigger axis is parallel to the tank axis.

15. The assembly of claim 12, wherein the heat sensitive element is fixed in a remote zone of the multifunction valve, to the tank.

* * * * *